May 25, 1965  J. J. FINN  3,185,392

OVEN TEMPERATURE CONTROL

Filed April 29, 1963

INVENTOR.
John J. Finn
BY Ralph Hammar
Attorney

United States Patent Office 3,185,392
Patented May 25, 1965

3,185,392
OVEN TEMPERATURE CONTROL
John J. Finn, Erie, Pa., assignor of one-half to Glenn Electric Heater Corporation, Erie, Pa., a corporation of Pennsylvania
Filed Apr. 29, 1963, Ser. No. 276,230
1 Claim. (Cl. 236—15)

This invention is intended to improve oven temperature controls of the type in which a thermocouple or other device responsive to the internal roast temperature cuts in an auxiliary heating element to increase the temperature of the main oven control bulb above its ambient and thereby prevent over cooking even though the roast is left in the oven for several hours. Difficulty has been experienced in arranging the auxiliary heating element. Wrapping the auxiliary heating element in spaced turns around the main bulb is expensive to install, substantially impossible to keep clean and does not maintain its performance in use.

These difficulties are overcome by a sheathed auxiliary heating element mounted directly below the main bulb and heating the main bulb primarily by convection. This construction also simplifies and reduces the cost of installation.

Figure 1:
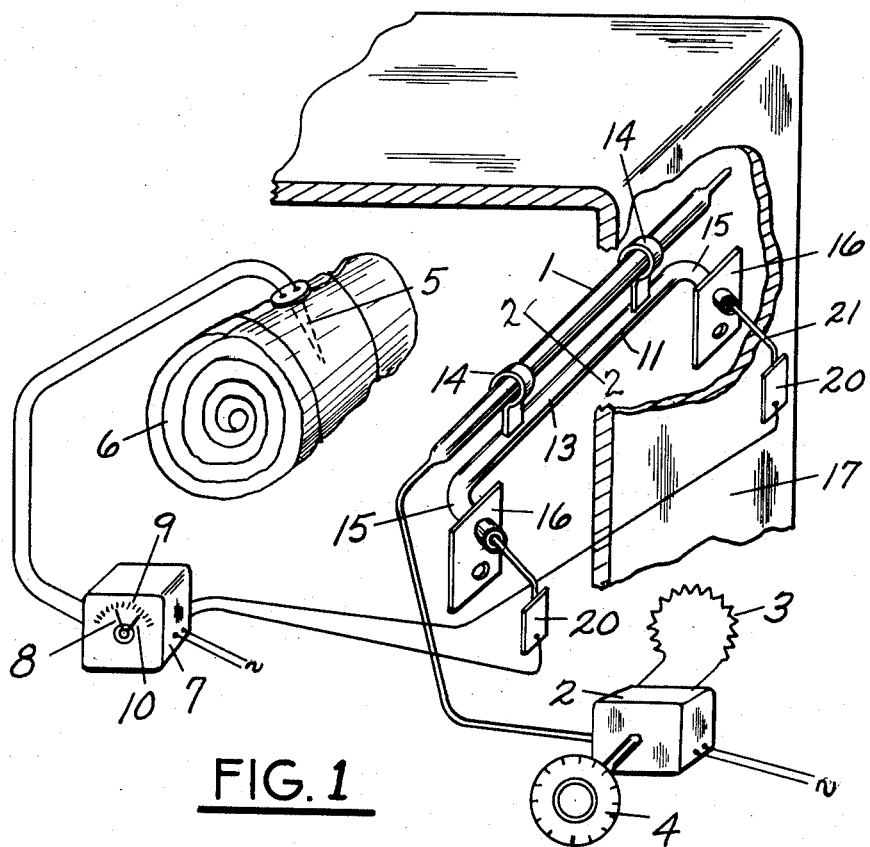
Figure 2:
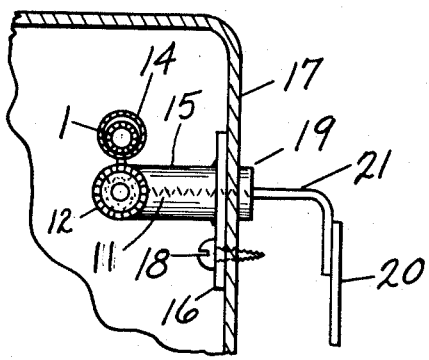

In the drawing, FIG. 1 is a diagram of an oven control with parts of the oven broken away, and FIG. 2 is a section on line 2—2 of FIG. 1.

In the drawing, 1 indicates the oven temperature control bulb connected to the control 2 for the oven heating element 3 which may be electric (as shown), gas, etc. The control is set by a knob 4 to the desired oven temperature and the heating element 3 is turned "on" whenever the bulb 1 calls for heat and "off" when the desired temperature is reached. This is a common type of oven control and need not be further illustrated.

For controlling the oven temperature while roasting meat, there is shown a probe 5 which is plunged into the center of the roast 6 and has a thermocouple for sensing the internal temperature of the roast. The thermocouple is connected to a control 7 having a pointer 8 for indicating the roast temperature on a dial 9. Associated with the control 7 is a pointer 10 which may be set to the desired internal temperature corresponding, for example, to rare, medium or well done. Upon reaching the desired internal temperature, (usually 160° F. or less) the pointer 8 comes into coincidence with the pointer 10 and a relay is actuated. The control 7 is a conventional control and is known as a roast meter.

The relay operated by the roast meter may merely signal that the roast is done. However, in case the signal is not observed, it is desirable that the roast be kept warm without overcooking so long as it remains in the oven. This is accomplished by an auxiliary heating element 11 which heats the main oven control bulb 1 above the ambient so that it does not call for heat in sufficient quantity to overcook the roast, even though the roast may remain in the oven for several hours after it is done. Because the auxiliary heating element 11 is close to the bulb 1, the actual temperature of the bulb is increased above the temperature set by the knob 4 and the oven heat is cut off until the oven temperature has dropped substantially below the temperature set by the knob 4. This reduces the heat supply sufficiently to prevent overcooking of the roast. If the heat supplied should be insufficient to maintain the internal roast temperature set by the pointer 10, the auxiliary heating element 11 will be cut out and the normal oven control reinstated until the internal roast temperature is brought back up to that set by the pointer 10.

A prior suggestion for the auxiliary heater 11 was resistance heating wires wrapped in an accurately spaced spiral throughout the length of the bulb 1. The spacing was required so that the bulb would be free to respond to the oven temperature. This solution has not been satisfactory. Neither the resistance heating wire nor the bulb can be kept clean. The loss of heat by radiation makes a higher wattage necessary.

These problems are overcome by the present auxiliary heater 11 which is of the sheathed type in that the heating element is completely enclosed within a tubular sheath 12. At the center of the heating element is a straight section 13 carrying loops 14 through which the bulb 1 may be easily inserted. At the ends are offset sections 15 fixed to mounting tabs 16 which are easily fastened to the oven wall 17 by sheet metal screws 18. When fastened to the oven wall, the heating element 11 provides a supporting bracket for the main bulb 1 which positions the bulb inward from the side and top walls of the oven so that it will accurately respond to the oven temperature when the element 11 is "off." While the bulb is firmly supported, it can be readily removed for cleaning by merely sliding out of the loops 14.

As shown in FIG. 2, the main oven bulb 1 is directly above and is heated primarily by convection from the auxiliary heating element 11. This provides a more efficient heat transfer so that the desired increase in bulb temperature may be obtained with lower wattage even though the auxiliary heater occupies only the central section of the length of the bulb. Furthermore, the convected heat is not affected by the surface characteristics of the main bulb. The auxiliary heater works equally well with the bright surfaced bulbs required for chrome plated ovens and with the dull surfaced bulbs required for the blue porcelain enameled ovens.

In the installed position, the inner ends 19 of the auxiliary heater project through the oven wall 17 and electrical connections are readily made to a tab 20 on the outer end of each lead wire 21. To install the auxiliary heater 11 it is only necessary to provide two holes in the oven wall for the ends 19 of the heater and two holes for the sheet metal screws 18. Upon tightening of the screws, the heater is solidly anchored to the oven wall and its clips 14 accurately position the main bulb 1 not only with relation to the auxiliary heater, but also with relation to the oven wall. There are no loose wires entering the oven. The connections to the auxiliary heater are all outside the oven wall. Nor is there any problem of cleaning. The heating element is completely enclosed within its sheath 12 and the main bulb may be readily removed from the clips for cleaning.

What is claimed as new is:
In combination with an oven, an oven control for roasts comprising a horizontal main thermostatic bulb spaced from a wall of the oven for controlling the oven temperature, a roast temperature element adapted to be embedded in the roast to respond to the internal roast temperature, a roast temperature control connected to said roast temperature element and actuated by the roast temperature as measured by said element reaching a predetermined temperature, an auxiliary sheathed heating element having ends extending through and fixed to said wall of the oven and having an intermediate horizontal section outstanding from said wall and directly below said main bulb, and supports for the main bulb carried by said intermediate section having loops slidably receiving the main bulb, said auxiliary element being energized by said actuation of the roast temperature control to heat the main bulb above the oven temperature whereby the main bulb is satisfied while the oven temperature is less than the main oven control setting.

References Cited by the Examiner

UNITED STATES PATENTS

| 1,757,951 | 5/30 | Breese | 236—68 X |
| 2,048,653 | 7/36 | Taylor | 236—68 X |
| 2,215,929 | 9/40 | Husk. | |
| 2,642,227 | 6/53 | Ray | 236—68 X |
| 2,914,644 | 11/59 | Holtkamp. | |
| 2,924,696 | 2/60 | Ammerman et al. | 219—395 |

EDWARD J. MICHAEL, *Primary Examiner.*

ALDEN D. STEWART, *Examiner.*